US008778500B2

(12) United States Patent
Kawasaki et al.

(10) Patent No.: US 8,778,500 B2
(45) Date of Patent: *Jul. 15, 2014

(54) LAMINATED POLYESTER FILM

(75) Inventors: Taishi Kawasaki, Shiga-ken (JP); Toshihiro Koda, Shiga-ken (JP); Masato Fujita, Shiga-ken (JP)

(73) Assignee: Mitsubishi Plastics, Inc., Tokyo (JP)

( * ) Notice: Subject to any disclaimer, the term of this patent is extended or adjusted under 35 U.S.C. 154(b) by 196 days.

This patent is subject to a terminal disclaimer.

(21) Appl. No.: 13/265,654

(22) PCT Filed: Apr. 15, 2010

(86) PCT No.: PCT/JP2010/056787
§ 371 (c)(1),
(2), (4) Date: Dec. 30, 2011

(87) PCT Pub. No.: WO2010/122949
PCT Pub. Date: Oct. 28, 2010

(65) Prior Publication Data
US 2012/0094113 A1      Apr. 19, 2012

(30) Foreign Application Priority Data

| Apr. 22, 2009 | (JP) | ................................ 2009-103872 |
| Apr. 22, 2009 | (JP) | ................................ 2009-103984 |
| Apr. 23, 2009 | (JP) | ................................ 2009-104582 |
| Apr. 23, 2009 | (JP) | ................................ 2009-104583 |

(51) Int. Cl.
*B32B 27/40* (2006.01)
*B32B 27/36* (2006.01)
*B32B 27/30* (2006.01)

(52) U.S. Cl.
USPC ....... 428/423.7; 428/483; 428/336; 428/1.31; 428/1.6

(58) Field of Classification Search
USPC ............ 428/1.31, 1.6, 336, 423.1, 423.7, 483
See application file for complete search history.

(56) References Cited

U.S. PATENT DOCUMENTS

| 6,165,602 A * | 12/2000 | Fujita ............................. 428/216 |
| 6,855,758 B2 * | 2/2005 | Murschall et al. ............. 524/195 |
| 6,921,580 B2 * | 7/2005 | Akatsu et al. ................. 428/480 |
| 2006/0210768 A1 * | 9/2006 | Masuda ......................... 428/141 |
| 2008/0261037 A1 | 10/2008 | Snow |
| 2010/0215902 A1 * | 8/2010 | Kiehne et al. ................. 428/141 |
| 2011/0045288 A1 * | 2/2011 | Koda et al. .................... 428/349 |
| 2011/0051245 A1 * | 3/2011 | Masuda et al. ................ 359/584 |
| 2011/0086172 A1 | 4/2011 | Snow |
| 2011/0086954 A1 | 4/2011 | Snow |
| 2011/0189489 A1 * | 8/2011 | Kawasaki et al. .......... 428/423.7 |

FOREIGN PATENT DOCUMENTS

| JP | 02-158633 | 6/1990 |
| JP | 02 158633 A | 6/1990 |
| JP | 11 005858 A | 1/1999 |
| JP | 2005-179486 | 7/2005 |
| JP | 2006 142769 A | 6/2006 |
| WO | WO 2009/119011 A1 | 10/2009 |

OTHER PUBLICATIONS

EP Search Report dated Sep. 6, 2012 in EP 10 76 7006.
Database WPI, Week 199030 Thomson Scientific, London, GB; AN 1990-229153, XP002682567, and JP 2 158633 A (Diafoil Co Ltd) Jun. 19, 1990 *abstract* *p. 2, lower left column—p. 3, upper left column* *p. 4, upper right column—p. 5, upper right column*.
Database WPI Week 199912 Thomson Scientific, London, GB; AN 1999-136780, XP002682568, and JP 11 005858 A (Diafoil Hoechst Co Ltd) Jan. 12, 1999, *abstract* *examples*.
Database WPI Week 200641 Thomson Scientific, London, GB; AN 2006-395805, XP002682569, and JP 2006 142769 A (Dainichiseika Color & Chem Mfg Co Ltd) Jun. 8, 2006 *abstract* *examples*.
International Search Report for PCT/JP2010/056787, mailed Jun. 22, 2010.

* cited by examiner

*Primary Examiner* — Thao T. Tran
(74) *Attorney, Agent, or Firm* — Nixon & Vanderhye P.C.

(57) ABSTRACT

The present invention provide a laminated polyester film which is capable of ensuring a good dimensional stability without being subjected to such a surface saponification treatment with an alkali solution as required for triacetyl cellulose films, is available at low costs, exhibits a good adhesion property to adhesives and a high total light transmittance, and can be suitably used as a protective film for polarizing films. The laminated polyester film of the present invention comprises a polyester film; a coating layer formed on one surface of the polyester film which comprises an acrylic resin or a urethane resin as a main component; and a coating layer formed on the other surface of the polyester film which comprises a urethane resin having a polycarbonate structure. In the preferred embodiment of the present invention, the coating layer comprising the acrylic resin or the urethane resin as a main component has a thickness of 0.04 to 0.15 μm, and the polyester film comprises an ultraviolet absorber.

24 Claims, No Drawings

LAMINATED POLYESTER FILM

This application is the U.S. national phase of International Application No. PCT/JP2010/56787 filed 15 Apr. 2010 which designated the U.S. and claims priority to JP 2009-103872 filed 22 Apr. 2009, JP 2009-103984 filed 22 Apr. 2009, JP 2009-104582 filed 23 Apr. 2009 and JP 2009-104583 filed 23 Apr. 2009, the entire contents of each of which are hereby incorporated by reference.

TECHNICAL FIELD

The present invention relates to a laminated polyester film, and more particularly, to a laminated polyester film which can be suitably used as a member for protecting a polarizing plate employed in liquid crystal displays.

BACKGROUND ART

In recent years, liquid crystal displays have been extensively used as a display device for TVs, personal computers, digital cameras, cellular phones, etc. The polarizing plate used in the liquid crystal displays is usually constructed of a polarizing film in the form of a dyed monoaxially stretched polyvinyl alcohol film, and triacetyl cellulose films (TAC films) as protective films attached onto the polarizing film (protective film/polarizing film/protective film). The TAC film has been frequently used as a protective film because of a high transparency and a good optical isotropy thereof. On the other hand, the TAC film tends to be deteriorated in dimensional stability, and further tends to have such a problem that the surface of the TAC film must be previously subjected to saponification treatment with an alkali solution before adhering to the polarizing film.

With the recent tendency toward increase in size and quality of liquid crystal displays, there is an increasing demand for high mechanical strength of these films. In addition, it has been required to prevent deterioration in quality of the films owing to bleed-out of low-molecular weight materials and increased haze when subjected to the alkali treatment. Further, the alkali treatment using a high-concentration alkali solution tends to be undesirable in view of working safety and environmental protection.

To solve these conventional problems, various materials other than the TAC films such as norbornene-based films have been proposed (Patent Documents 1 and 2). However, these other material films using no ordinary resins are expensive owing to high production costs. In consequence, there has been proposed the method of using films formed of polyesters as ordinary resins which are capable of ensuring a good dimensional stability and omitting the alkali treatments causing various problems, and further are advantageous in view of costs.

However, the polyester films by themselves tend to have problems such as deteriorated adhesion property to adhesives used for bonding the polarizing film and the protective film, and a low total light transmittance as compared to that of the TAC films, resulting in a low brightness of a polarizing plate obtained using the polyester films.

PRIOR ARTS

Patent Documents

Patent Document 1: Japanese Patent Application Laid-Open (KOKAI) No. 6-51117 (1994)

Patent Document 2: Japanese Patent Application Laid-Open (KOKAI) No. 2006-227090

SUMMARY OF THE INVENTION

Problems to be Solved by the Invention

The present invention has been accomplished to solve the above conventional problems. An object of the present invention is to provide a laminated polyester film which is capable of ensuring a good dimensional stability without being subjected to such a surface saponification treatment with an alkali solution as required for triacetyl cellulose films, is available at low costs, exhibits a good adhesion property to adhesives and a high total light transmittance, and can be suitably used as a protective film for polarizing films.

Means for Solving Problems

As a result of the present inventors' earnest study in view of the above problems, it has been found that these problems can be readily solved by using a laminated polyester film having a specific structure. The present invention has been attained on the basis of this finding.

That is, in an aspect of the present invention, there is provided a laminated polyester film comprising a polyester film, a coating layer formed on one surface of the polyester film which comprises an acrylic resin or a urethane resin as a main component, and a coating layer formed on the other surface of the polyester film which comprises a urethane resin having a polycarbonate structure.

Effect of the Invention

In accordance with the present invention, there can be provided a laminated polyester film which has a good adhesion property to adhesives for bonding a polarizing film thereto, for example, when used as a protective film for polarizing plates, and is excellent in total light transmittance of a polarizing plate formed therefrom. Therefore, the present invention has a high industrial value.

PREFERRED EMBODIMENTS FOR CARRYING OUT THE INVENTION

The present invention is described in more detail below.

The polyester film constituting the laminated polyester film of the present invention may have either a single layer structure or a multilayer structure. Unless departing from the scope of the present invention, the polyester film may have not only a two or three layer structure but also a four or more multilayer structure, and the layer structure of the polyester film is not particularly limited.

The polyester used in the present invention may be either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned at least one compound selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned at least one compound selected from the group consisting of ethylene glycol, diethylene glycol, propylene glycol, butanediol, 4-cyclohexanedimethanol and neopentyl glycol.

The polyester film used in the present invention preferably comprises an ultraviolet absorber in order to prevent a liquid crystal or the like in the liquid crystal displays from being deteriorated owing to irradiation with an ultraviolet ray. The ultraviolet absorber is not particularly limited as long as it is a compound having a capability of absorbing an ultraviolet ray and can withstand heat applied during a process for producing the polyester film.

As the ultraviolet absorber, there are generally known an organic ultraviolet absorber and an inorganic ultraviolet absorber. In view of a good transparency, among these ultraviolet absorbers, the organic ultraviolet absorber is preferred. Examples of the organic ultraviolet absorber include, but are not particularly limited to, cyclic iminoester-based ultraviolet absorbers, benzotriazole-based ultraviolet absorbers and benzophenone-based ultraviolet absorbers. Among these organic ultraviolet absorbers, cyclic iminoester-based ultraviolet absorbers and benzotriazole-based ultraviolet absorbers are preferred in view of a good durability. These ultraviolet absorbers may be used in combination of any two or more thereof.

Specific examples of the benzotriazole-based ultraviolet absorbers include, but are not particularly limited to, 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl]-2H-benzotriazole, 2-[2'-hydroxy-3'-tert-butyl-5'-(methacryloyloxyethyl)phenyl]-2H-benzotriazole, 2-[2'-hydroxy-5'-tert-butyl-3'-(methacryloyloxyethyl)phenyl]-2H-benzotriazole, 2-[2'-hydroxy-5'-(methacryloyloxyethyl)phenyl]-5-chloro-2H-benzotriazole, 2-[2'-hydroxy-5'-(methacryloyloxyethyl)phenyl]-5-methoxy-2H-benzotriazole, 2-[2'-hydroxy-5'-(methacryloyloxyethyl)phenyl]-5-cyano-2H-benzotriazole, 2-[2'-hydroxy-5'-(methacryloyloxyethyl)phenyl]-5-tert-butyl-2H-benzotriazole and 2-[2'-hydroxy-5'-(methacryloyloxyethyl)phenyl]-5-nitro-2H-benzotriazole.

Specific examples of the cyclic iminoester-based ultraviolet absorbers include, but are not particularly limited to, 2-methyl-3,1-benzoxazin-4-one, 2-butyl-3,1-benzoxazin-4-one, 2-phenyl-3,1-benzoxazin-4-one, 2-(1- or 2-naphthyl)-3,1-benzoxazin-4-one, 2-(4-biphenyl)-3,1-benzoxazin-4-one, 2-p-nitrophenyl-3,1-benzoxazin-4-one, 2-m-nitrophenyl-3,1-benzoxazin-4-one, 2-p-benzoylphenyl-3,1-benzoxazin-4-one, 2-p-methoxyphenyl-3,1-benzoxazin-4-one, 2-o-methoxyphenyl-3,1-benzoxazin-4-one, 2-cyclohexyl-3,1-benzoxazin-4-one, 2-p-(or m-)phthalimidophenyl-3,1-benzoxazin-4-one, N-phenyl-4-(3,1-benzoxazin-4-on-2-yl)phthalimide, N-benzoyl-4-(3,1-benzoxazin-4-on-2-yl)aniline, N-benzoyl-N-methyl-4-(3,1-benzoxazin-4-on-2-yl)aniline, 2-(p-(N-methylcarbonyl)phenyl-3,1-benzoxazin-4-one, 2,2'-bis(3,1-benzoxazin-4-one), 2,2'-ethylene-bis(3,1-benzoxazin-4-one), 2,2'-tetramethylene-bis(3,1-benzoxazin-4-one), 2,2'-decamethylene-bis(3,1-benzoxazin-4-one) 2,2'-p-phenylene-bis(3,1-benzoxazin-4-one), 2,2'-m-phenylene-bis(3,1-benzoxazin-4-one), 2,2'-(4,4'-diphenylene)bis(3,1-benzoxazin-4-one), 2,2'-(2,6- or 1,5-naphthylene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), 2,2'-(2-chloro-p-phenylene)bis(3,1-benzoxazin-4-one), 2,2'-(1,4-cyclohexylene)bis(3,1-benzoxazin-4-one), 1,3,5-tri(3,1-benzoxazin-4-on-2-yl)benzene, 1,3,5-tri(3,1-benzoxazin-4-on-2-yl)naphthalene, 2,4,6-tri(3,1-benzoxazin-4-on-2-yl)naphthalene, 2,8-dimethyl-4H,6H-benzo(1,2-d; 5,4-d')bis(1,3)-oxazin-4,6-dione, 2,7-dimethyl-4H,9H-benzo(1,2-d; 4,5-d')bis(1,3)-oxazin-4,9-dione, 2,8-diphenyl-4H,8H-benzo(1,2-d; 5,4-d')bis(1,3)-oxazin-4,6-dione, 2,7-diphenyl-4H,9H-benzo(1,2-d; 4,5-d')bis(1,3)-oxazin-4,6-dione, 6,6'-bis(2-methyl-4H,3,1-benzoxazin-4-one), 6,6'-bis(2-ethyl-4H,3,1-benzoxazin-4-one), 6,6'-bis(2-phenyl-4H,3,1-benzoxazin-4-one), 6,6'-methylene-bis(2-methyl-4H,3,1-benzoxazin-4-one), 6,6'-methylene-bis(2-phenyl-4H,3,1-benzoxazin-4-one), 6,6'-ethylene-bis(2-methyl-4H,3,1-benzoxazin-4-one), 6,6'-ethylene-bis(2-phenyl-4H,3,1-benzoxazin-4-one), 6,6'-butylene-bis(2-methyl-4H,3,1-benzoxazin-4-one) 6,6'-butylene-bis(2-phenyl-4H,3,1-benzoxazin-4-one), 6,6'-oxy-bis(2-methyl-4H,3,1-benzoxazin-4-one), 6,6'-oxy-bis(2-phenyl-4H,3,1-benzoxazin-4-one), 6,6'-sulfonyl-bis(2-methyl-4H,3,1-benzoxazin-4-one), 6,6'-sulfonyl-bis(2-phenyl-4H,3,1-benzoxazin-4-one), 6,6'-carbonyl-bis(2-methyl-4H,3,1-benzoxazin-4-one), 6,6'-carbonyl-bis(2-phenyl-4H,3,1-benzoxazin-4-one), 7,7'-methylene-bis(2-methyl-4H,3,1-benzoxazin-4-one), 7,7'-methylene-bis(2-phenyl-4H,3,1-benzoxazin-4-one), 7,7'-bis(2-methyl-4H,3,1-benzoxazin-4-one), 7,7'-ethylene-bis(2-methyl-4H,3,1-benzoxazin-4-one), 7,7'-oxy-bis(2-methyl-4H,3,1-benzoxazin-4-one), 7,7'-sulfonyl-bis(2-methyl-4H,3,1-benzoxazin-4-one), 7,7'-carbonyl-bis(2-methyl-4H,3,1-benzoxazin-4-one), 6,7'-bis(2-methyl-4H,3,1-benzoxazin-4-one), 6,7'-bis(2-phenyl-4H,3,1-benzoxazin-4-one), 6,7'-methylene-bis(2-methyl-4H,3,1-benzoxazin-4-one) and 6,7'-methylene-bis(2-phenyl-4H,3,1-benzoxazin-4-one).

Among the above compounds, in view of a good hue, the benzoxazinone-based compounds are preferably used because they are hardly colored yellowish. Examples of the suitable benzoxazinone-based compounds include those compounds represented by the following general formula (1).

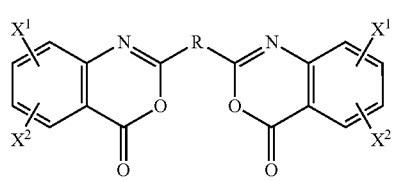

(1)

In the above general formula, R is a divalent aromatic hydrocarbon group; and $X^1$ and $X^2$ are each independently hydrogen or a group selected from the following functional groups, although not particularly limited thereto.

Examples of the functional groups include an alkyl group, an aryl group, a heteroaryl group, halogen, an alkoxy group, an aryloxy group, a hydroxyl group, a carboxyl group, an ester group and a nitro group.

In the present invention, among the compounds represented by the above structural formula, 2,2'-(1,4-phenylene)bis[4H-3,1-benzoxazin-4-one] is especially preferred.

The amount of the ultraviolet absorber incorporated in the laminated polyester film of the present invention is preferably in the range of 0.1 to 10.0% by weight and more preferably 0.3 to 3.0% by weight. When the amount of the ultraviolet absorber added is less than 0.1% by weight, the amount of ultraviolet ray absorbed tends to be reduced, so that the ultraviolet ray tends to be penetrated through the polyester film, thereby failing to sufficiently prevent the liquid crystal from being deteriorated depending upon the applications thereof. When the amount of the ultraviolet absorber added is more than 10.0% by weight, the ultraviolet absorber tends to be bled out onto the surface of the laminated polyester film, which tends to result in deterioration in surface functionality such as deterioration in adhesion property, etc.

The film in the form of a multilayer film preferably has at least three layer structure. In this case, the ultraviolet absorber is preferably incorporated in an intermediate layer thereof. By incorporating the ultraviolet absorber in the intermediate layer, the compound can be prevented from being bled out onto the surface of the film, so that the resulting film can maintain its properties such as adhesion property.

The laminated polyester film of the present invention preferably has a light transmittance of not more than 10% and more preferably not more than 5% as measured at a wavelength of 380 nm for the purpose of preventing deterioration of liquid crystal owing to irradiation with an ultraviolet ray when it is used as a protective film for polarizing films.

For the purpose of imparting an easy-slipping property to the film and preventing occurrence of flaws in the film during the respective steps, particles are preferably compounded in the polyester layer in the film of the present invention.

The kinds of particles to be compounded in the polyester layer are not particularly limited as long as the particles are capable of imparting a good easy-slipping property to the film. Specific examples of the particles include particles of silica, calcium carbonate, magnesium carbonate, barium carbonate, calcium sulfate, calcium phosphate, magnesium phosphate, kaolin, aluminum oxide, titanium oxide, etc. In addition, there may also be used heat-resistant organic particles as described in Japanese Patent Publication (KOKOKU) No. 59-5216 (1984), Japanese Patent Application Laid-Open (KOKAI) No. 59-217755 (1984) or the like. Examples of the other heat-resistant organic particles include particles of thermosetting urea resins, thermosetting phenol resins, thermosetting epoxy resins, benzoguanamine resins, etc. Further, there may also be used deposited particles obtained by precipitating and finely dispersing a part of metal compounds such as a catalyst during the process for production of the polyester.

On the other hand, the shape of the particles used above is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The average particle diameter of the particles used above is usually in the range of 0.01 to 3 µm and preferably 0.1 to 2 µm. When the average particle diameter of the particles is less than 0.01 µm, the particles may fail to impart a sufficient easy-slipping property to the polyester layer, or tend to be aggregated together and therefore exhibit a poor dispersibility, which will cause deterioration in transparency of the resulting film. On the other hand, when the average particle diameter of the particles is more than 3 µm, the surface roughness of the obtained film tends to be too coarse, so that there tend to occur problems when forming functional layers such as a prism layer and a light diffusion layer and the like thereon in the subsequent steps.

The content of the particles in the polyester layer is usually in the range of 0.001 to 5% by weight and preferably 0.005 to 3% by weight. When the content of the particles in the polyester layer is less than 0.001% by weight, the resulting film tends to be insufficient in easy-slipping property. On the other hand, when the content of the particles in the polyester layer is more than 5% by weight, the resulting film tends to be insufficient in transparency.

The method of adding the particles to the polyester layer is not particularly limited, and any conventionally known methods can be suitably used therefor. For example, the particles may be added at any optional stages in the process for production of the polyester forming the respective layers. The particles are preferably added to the polyester after completion of the esterification reaction or transesterification reaction.

In addition, there may also be used the method of blending a slurry of the particles prepared by dispersing the particles in ethylene glycol or water with the raw polyester material using a vented kneading extruder, the method of blending the dried particles with the raw polyester material using a kneading extruder, or the like.

Meanwhile, the polyester film used in the present invention may also comprise, in addition to the above particles, known additives such as an antioxidant, an antistatic agent, a thermal stabilizer, a lubricant, a dye, a pigment, etc., if required.

The thickness of the polyester film used in the present invention is not particularly limited as long as it lies within any suitable range capable of keeping a film shape, and is usually in the range of 10 to 200 µm and preferably 25 to 50 µm.

Next, an example of the process of producing the polyester film used in the present invention is more specifically explained, although not particularly limited thereto.

That is, in the production process, there is preferably used such a method in which the above-mentioned raw polyester material is extruded from a die in the form of a molten sheet, and the molten sheet is cooled and solidified on a cooling roll to obtain an unstretched sheet. In this case, in order to enhance a flatness of the sheet, it is preferred to enhance adhesion between the sheet and a rotary cooling drum. For this purpose, an electrostatic adhesion method and/or a liquid coating adhesion method are preferably used. Next, the thus obtained unstretched sheet is biaxially stretched. In such a case, the unstretched sheet is first stretched in one direction thereof using a roll-type or tenter-type stretching machine. The stretching temperature is usually 70 to 120° C. and preferably 80 to 110° C., and the stretch ratio is usually 2.5 to 7 times and preferably 3.0 to 6 times. Next, the thus stretched film is stretched in the direction perpendicular to the stretching direction of the first stage. In this case, the stretching temperature is usually 70 to 170° C., and the stretch ratio is usually 3.0 to 7 times and preferably 3.5 to 6 times. Successively, the resulting biaxially stretched sheet is heat-treated at a temperature of 180 to 270° C. under a tension or relaxation within 30% to obtain a biaxially stretched film. Upon the above stretching step, there may also be used the method in which the stretching in each direction is carried out in two or more stages. In such a case, the multi-stage stretching is preferably performed such that the stretch ratio in each of the two directions is finally fallen within the above-specified range.

Also, upon producing the polyester film constituting the laminated polyester film according to the present invention, there may also be used a simultaneous biaxial stretching method. The simultaneous biaxial stretching method is such a method in which the above unstretched sheet is stretched and oriented in both of the machine and width directions at the same time while maintaining the sheet in a suitable temperature-controlled condition at a temperature of usually 70 to 120° C. and preferably 80 to 110° C. The stretch ratio used in the simultaneous biaxial stretching method is 4 to 50 times, preferably 7 to 35 times and more preferably 10 to 25 times in terms of an area ratio of the film. Successively, the obtained biaxially stretched sheet is heat-treated at a temperature of 170 to 250° C. under a tension or relaxation within 30% to obtain a stretched oriented film. As the apparatus used in the above simultaneous biaxial stretching method, there may be employed those stretching apparatuses of any conventionally known type such as a screw type stretching apparatus, a pantograph type stretching apparatus and a linear drive type stretching apparatus.

Next, the method of forming the coating layers constituting the laminated polyester film according to the present invention is explained. The coating layers may be formed by either an in-line coating method in which the surface of the polyester film is subjected to coating treatment during the stretching step of the polyester film, an off-line coating method in which the polyester film produced is once transferred to an outside of the film production system and subjected to coating treatment, or combination of these methods. Among these methods, the in-line coating method is preferably used because the coating layers can be produced simultaneously with formation of the polyester film and therefore at low costs, and the thicknesses of the coating layers can be varied by controlling a stretch ratio of the polyester film.

For example, in the case of a sequential biaxial stretching, the in-line coating treatment may be carried out, in particular, after completion of the longitudinal stretching but before initiation of the lateral stretching, although not particularly limited thereto. When the coating layers are formed on the polyester film by the in-line coating method, the coating can be carried out simultaneously with formation of the polyester film, and the coating layers can be treated at a high temperature. As a result, it is possible to produce a film suitable as the polyester film used in the present invention.

In the present invention, it is essentially required that the coating layer comprising an acrylic resin or a urethane resin as a main component (hereinafter occasionally referred to merely as a "first coating layer") is formed on one surface of the polyester film, and the coating layer comprising a urethane resin having a polycarbonate structure (hereinafter occasionally referred to merely as a "second coating layer") is formed on the other surface of the polyester film.

The first coating layer in the laminated polyester film of the present invention is a coating layer capable of enhancing a total light transmittance of a polarizing plate formed using the laminated polyester film. The total light transmittance of the laminated polyester film may be determined in view of optical properties of the polyester film, first coating layer and second coating layer. When the laminated polyester film is used as a protective film attached to a polarizing film, the optical properties of the laminated polyester film on the attaching side thereof do not largely contribute to a total light transmittance of the polarizing plate as a whole. Therefore, the optical properties of the laminated polyester film on the non-attaching side thereof, i.e., on the first coating layer side, are most important. The total light transmittance of the laminated polyester film may also vary according to influence of the second coating layer and therefore is not particularly limited. However, in general, the total light transmittance of the laminated polyester film is usually not less than 90.0%, preferably not less than 90.5%, and more preferably not less than 91.0%.

As a result of various studies for more accurately understanding the optical properties of the first coating layer only and examining the total light transmittance of the polarizing plate formed using the laminated polyester film, it has been found that the discussion about an absolute reflectance of the first coating layer only is preferred. The reflectance and the transmittance are properties having an interrelation with each other. It has been noticed that in the polyester film having a less light absorption and a high transparency, a higher transparency thereof generally indicates a lower reflectance.

In the present invention, one minimum value of the absolute reflectance of the first coating layer is preferably present in the wavelength range of 300 to 800 nm, and the absolute reflectance as measured at the minimum value is not more than 3.5%. The minimum value of the absolute reflectance is more preferably present in the wavelength range of 400 to 700 nm and still more preferably 450 to 650 nm. In addition, the absolute reflectance as measured at the minimum value is more preferably not more than 3.0% and still more preferably not more than 2.5%.

When the total light transmittance of the laminated polyester film is less than 90.0% or when the absolute reflectance of the first coating layer is out of the above-specified range, the polarizing plate obtained using the laminated polyester film tends to exhibit a low total light transmittance and therefore tends to be deteriorated in brightness, so that the resulting liquid crystal displays tend to have a dark image plane in some cases.

The acrylic resin and urethane resin generally have a low refractive index and therefore are materials suitable for enhancing a total light transmittance. In addition, by controlling a thickness of the coating layer to 0.04 to 0.15 μm, the total light transmittance of the laminated polyester film can be more effectively enhanced.

The acrylic resin incorporated in the first coating layer of the film according to the present invention is in the form of a polymer obtained from a polymerizable monomer having a carbon-to-carbon double bond such as, typically, an acrylic monomer and a methacrylic monomer. The polymer may be either a homopolymer or a copolymer. The polymer may also include a copolymer of the polymer and the other polymer (for example, a polyester, a polyurethane, etc). Examples of the copolymer include a block copolymer and a graft copolymer. In addition, the polymer may also include a polymer obtained by polymerizing the polymerizable monomer having a carbon-to-carbon double bond in a polyester solution or a polyester dispersion (which may also be in the form of a mixture of the polymers). Further, the polymer may also include a polymer obtained by polymerizing the polymerizable monomer having a carbon-to-carbon double bond in a polyurethane solution or a polyurethane dispersion (which may also be in the form of a mixture of the polymers). Similarly, the polymer may also include a polymer obtained by polymerizing the polymerizable monomer having a carbon-to-carbon double bond in the other polymer solution or the other polymer dispersion (which may also be in the form of a mixture of the polymers). Further, in order to enhance the total light transmittance in a more efficient manner, there may also be used compounds comprising a fluorine atom having a low refractive index.

The above polymerizable monomer having a carbon-to-carbon double bond is not particularly limited. Examples of the typical compounds as the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl (meth)acrylate, 2-hydroxypropyl (meth)acrylate, 4-hydroxybutyl (meth)acrylate, monobutylhydroxyl fumarate and monobutylhydroxyl itaconate; various (meth)acrylic acid esters such as methyl (meth)acrylate, ethyl (meth)acrylate, propyl (meth)acrylate, butyl (meth)acrylate and lauryl (meth)acrylate; various nitrogen-containing vinyl-based monomers such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl acetate and vinyl propionate; various silicon-containing polymerizable monomers such as γ-methacryloxypropyl trimethoxysilane and vinyl trimethoxysilane; various phosphorus-containing vinyl-based monomers; various halogenated vinyl-based monomers such as vinyl chloride, vinylidene chloride, vinyl fluoride, vinylidene fluoride, trifluorochloroethylene, tetrafluoroethylene, chlorotrifluoroethylene and hexafluoropropylene; and various conjugated dienes such as butadiene.

The urethane resin included in the first coating layer of the film according to the present invention is a high-molecular compound having a urethane bond in a molecule thereof. The urethane resin may be usually produced by the reaction between a polyol and an isocyanate. Examples of the polyol include polyester polyols, polyether polyols, polyolefin polyols, acrylic polyols and polycarbonate polyols which may be included in the below-mentioned second coating layer. These compounds may be used alone or in combination of any two or more thereof.

Examples of the polyester polyols include those produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol).

Examples of the polyether polyols include polyethylene glycol, polypropylene glycol, polyethylene/propylene glycol, polytetramethylene ether glycol and polyhexamethylene ether glycol.

In order to obtain the urethane resin to be included in the first coating layer, there may be used the polyol, the isocyanate compound used for obtaining the above urethane resin having a polycarbonate structure, and a chain extender. In addition, in view of a suitability for the in-line coating, water-dispersible or water-soluble urethane resins are preferably used. In order to impart a water dispersibility or a water solubility to the urethane resins, it is important that a hydrophilic group such as a hydroxyl group, a carboxyl group, a sulfonic group, a sulfonyl group, a phosphoric group and an ether group is introduced into the urethane resins. Among these hydrophilic groups, from the viewpoints of good coating film properties and a good adhesion property, preferred is a carboxyl group.

In the film of the present invention, the content of the acrylic resin or the urethane resin in the first coating layer may vary depending upon the refractive index of the acrylic resin or the urethane resin and therefore is not particularly limited. However, in general, the content of the acrylic resin or the urethane resin in the first coating layer is preferably in the range of not less than 40%, more preferably not less than 50% and still more preferably not less than 60% in terms of a weight ratio based on the total weight of the coating layer. When the content of the acrylic resin or the urethane resin in the first coating layer is less than 40%, the resulting film tends to be hardly improved in total light transmittance to a sufficient extent.

In the first coating layer of the film according to the present invention, in order to improve surface properties of the coating layer and enhance a transparency, a binder polymer other than the acrylic resin and the urethane resin may be used in combination therewith. As the binder resin used in combination with the acrylic resin or the urethane resin, the resin having a high refractive index is preferably used only in a less amount so as not to cause adverse influence on a total light transmittance of the resulting film.

The "binder polymer" used in the present invention is defined as a high-molecular compound having a number-average molecular weight (Mn) of not less than 1000 as measured by gel permeation chromatography (GPC) according to a flow scheme for evaluation of safety of high-molecular compounds (Council of Chemical Substances; November, 1985), and exhibiting a good film-forming property.

Specific examples of the binder polymer include polyester resins, urethane resins, polyvinyl resins (such as polyvinyl alcohol, polyvinyl chloride and vinyl chloride-vinyl acetate copolymers), polyalkylene glycols, polyalkylene imines, methyl cellulose, hydroxy cellulose, starches, etc.

Further, in the first coating layer, the above resin components may be used in combination with a crosslinking agent unless the subject matter of the present invention is adversely affected thereby. By using the crosslinking agent, the coating layer can be strengthened in its structure and, as a result, tends to be enhanced in a wet heat resistance and a marring resistance. As the crosslinking agent, there may be used various known resins. Examples of the crosslinking agent include melamine compounds, epoxy compounds, oxazoline compounds, isocyanate compounds and carbodiimide compounds.

The melamine compounds are compounds having a melamine skeleton therein. Examples of the melamine compounds include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a di- or higher polymer, or may be in the form of a mixture thereof. In addition, there may also be used those compounds obtained by co-condensing a urea or the like to a part of melamine. Further, a catalyst may also be used to enhance a reactivity of the melamine compound.

Examples of the epoxy compound include compounds having an epoxy group in a molecule thereof, and prepolymers and cured products of the compounds. Examples of the epoxy compound include condensates of epichlorohydrin and a polyhydric alcohol. Examples of the polyhydric alcohol include ethylene glycol, polyethylene glycol, glycerol, polyglycerol and bisphenol A. In particular, a reaction product of a low-molecular polyol and epichlorohydrin can provide an epoxy resin having an excellent water solubility.

Examples of the oxazoline compound include those compounds having an oxazoline ring in a molecule thereof such as monomers having an oxazoline ring and polymers synthesized by using the oxazoline compound as one of raw monomers thereof.

Examples of the isocyanate compound include those compounds having an isocyanate group in a molecule thereof.

Specific examples of the isocyanate compound include hexamethylene diisocyanate, trimethyl hexamethylene diisocyanate, cyclohexylene diisocyanate, xylylene diisocyanate, isophorone diisocyanate, naphthalene diisocyanate, tolylene diisocyanate, and polymers or derivatives of these compounds.

These crosslinking agents may be used alone or in the form of a mixture of any two or more thereof. Further, in view of the application to in-line coating, the crosslinking agent preferably exhibits a water solubility or a water dispersibility.

In addition, for the purpose of improving an anti-blocking property and a slip property of the coating layer, the first coating layer may also comprise particles. Examples of the particles used in the first coating layer include inorganic particles such as silica, alumina and metal oxides, and organic particles such as crosslinked polymer particles.

The second coating layer used in the present invention is a coating layer for enhancing an adhesion property to various functional layers. For example, the second coating layer may be used for enhancing an adhesion property to various adhesives used for attaching the polarizing film to the laminated polyester film of the present invention.

The urethane resin having a polycarbonate structure which is included in the second coating layer in the present invention is such a urethane resin obtained by using a polycarbonate-based compound as one of polyols as main components constituting the urethane resin.

The polycarbonate-based polyols are obtained from a polyhydric alcohol and a carbonate compound by dealcoholization reaction therebetween. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexanedimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate-based polyols obtained by the reaction between these compounds include poly(1,6-hexylene)carbonate and poly(3-methyl-1,5-pentylene)carbonate.

Examples of the polyisocyanate compound used for obtaining the urethane resin include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as $\alpha,\alpha,\alpha',\alpha'$-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof.

In addition, unless the effects of the present invention are adversely affected, the second coating layer may comprise polyols other than the polycarbonate-based polyols. Examples of the polyols other than the polycarbonate-based polyols include polyether polyols, polyester polyols, polyolefin polyols and acrylic polyols. These compounds may be used alone or in combination of any two or more thereof.

When the urethane resin is synthesized, there may be used a chain extender. The chain extender is not particularly limited as long as it has tow or more active groups capable of reacting with an isocyanate group. In general, there may be mainly used such a chain extender having two hydroxyl groups or two amino group.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate.

Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidenecyclohexyl-4,4'-diamine, 1,4-diaminocyclohexane and 1,3-bisaminomethyl cyclohexane.

The urethane resin comprising the polycarbonate as its constitutional component as used in the present invention may be dispersed or dissolved in a solvent as a medium, and is preferably dispersed or dissolved in water as the medium.

In order to disperse or dissolve the urethane resin in water, there may be used those urethane resins of a forcibly emulsifiable type which can be dispersed and dissolved using an emulsifier, or those urethane resins of a self-emulsifiable type or a water-soluble type which are obtained by introducing a hydrophilic group into urethane resins, etc. Among these urethane resins, in particular, self-emulsifiable type urethane resins which are ionomerized by introducing an ionic group into a skeleton of urethane resins are preferred because they are excellent in storage stability of the coating solution as well as water resistance, transparency and adhesion property of the resulting coating layer. Examples of the ionic group to be introduced into the urethane resins include various groups such as a carboxyl group, a sulfonic acid group, a phosphoric acid group, a phosphonic acid group and a quaternary ammonium salt group. Among these ionic groups, preferred is a carboxyl group.

As the method of introducing a carboxyl group into the urethane resin, there may be used various methods which may be carried out in respective stages of the polymerization reaction. For example, there may be used the method in which a carboxyl group-containing resin is used as a comonomer component upon synthesis of a prepolymer, or the method in which a carboxyl group-containing component is used as any one component of the polyol, the polyisocyanate, the chain extender and the like. In particular, there is preferably used the method in which a carboxyl group-containing diol is used to introduce a desired amount of a carboxyl group into the urethane resins by suitably adjusting an amount of the diol charged. For example, the diol used in the polymerization for production of the urethane resin may be copolymerized with dimethylol propionic acid, dimethylol butanoic acid, bis-(2-hydroxyethyl)propionic acid, bis-(2-hydroxyethyl)butanoic acid, etc. In addition, the carboxyl group thus introduced is preferably formed into a salt thereof by neutralizing the carboxyl group with ammonia, amines, alkali metals, inorganic alkalis, etc. Among these compounds used for the neutralization, especially preferred are ammonia, trimethylamine and triethylamine. When using such a polyurethane resin, the carboxyl group thereof from which the neutralizing agent is removed in the drying step after the coating step may be used as a crosslinking reaction site which can be reacted with other crosslinking agents. As a result, the above-described urethane resin is excellent in stability when preserved in the form of a solution before being coated, and further the coating layer obtained therefrom can be further improved in durability, solvent resistance, water resistance, anti-blocking property, etc.

In particular, as the urethane resin preferably used in the present invention, there may be mentioned resins constituted from a polycarbonate polyol, a polyisocyanate and a compound comprising a group capable of reacting with a chain extender having a reactive hydrogen atom and an isocyanate group, and at least one anionic group. The content of the anionic group in the urethane resin is preferably 0.05 to 8% by weight. When the anionic group content is too small, the resulting urethane resin tends to be deteriorated in water solubility or water dispersibility. When the anionic group content is too large, the coating layer obtained after the coating step tends to be deteriorated in water resistance, or may absorb a moisture therein, so that the obtained films tend to be adhered to each other.

The content of the polycarbonate component in the urethane resin is usually 10 to 90% by weight and preferably 20 to 70% by weight. When the content of the polycarbonate component is less than 10% by weight, the resulting urethane resin tends to exhibit a poor adhesion-improving effect. When the content of the polycarbonate component is more than 90% by weight, the resulting urethane resin tends to be deteriorated in coatability.

Meanwhile, the urethane resin used in the present invention preferably has a glass transition point (hereinafter occasionally referred to merely as "Tg") of not higher than 10° C. When Tg of the urethane resin is higher than 10° C., the resulting coating layer tends to be insufficient in easy-bonding property. The Tg as used herein means the temperature at which a dynamic viscoelasticity E" becomes maximum as measured with respect to a dried coating film formed of the urethane resin.

Further, the urethane resin having a polycarbonate structure which is included in the second coating layer in the present invention may be in the form of a compound having a double bond. The double bond serves for enhancing adhesion of the second coating layer to a layer formed on the second coating layer. In the case where the layer formed on the second coating layer is a curable resin layer obtained by radical reaction of a double bond, etc., the curable resin layer can also be reacted with a double bond being present in the second coating layer, so that adhesion between both the layers can be more strengthened. In this case, portions strongly bonded to each other through a carbon-to-carbon bond are formed between the second coating layer and the layer formed thereon, so that adhesion between the layers can be effectively improved even when the glass transition point of the urethane resin having a polycarbonate structure is not low.

When introducing the double bond into the urethane resin having a polycarbonate structure, a vinyl group is preferably introduced thereinto in view of a good reactivity by radicals, etc. The vinyl group may be introduced into the urethane resin in the respective steps for production of the urethane resin by various methods. For example, there may be used the method in which a resin having a vinyl group is used as a comonomer component upon synthesis of a prepolymer of the urethane resin, or the method in which a vinyl group-containing diol, diamine or amino alcohol, etc., is used, if required, in the respective steps of the polymerization. More specifically, a vinyl ether compound such as 2-hydroxyethyl vinyl ether, diethylene glycol monovinyl ether and 4-hydroxybutyl vinyl ether may be previously copolymerized with a part of comonomer components.

The content of the vinyl group in the urethane resin is not particularly limited, and the vinyl group may be introduced into the urethane resin, for example, in an amount of not less than 1 mol per 100 mol of a urethane bond in the urethane resin. When it is intended to further enhance an adhesion property of the coating layer, the vinyl group may be used in an amount of not less than 5 mol. The upper limit of the amount of the vinyl group introduced is not particularly limited. However, even if an excess amount of the vinyl group is introduced, no further effect is attained by introduction of the vinyl group, and rather the resulting urethane resin tends to be deteriorated in mechanical properties. Therefore, the content of the vinyl group in the urethane resin is preferably not more than 50 mol and more preferably not more than 25 mol.

The second coating layer in the film of the present invention preferably comprises a crosslinking agent for the purposes of increasing a coating film strength of the obtained coating layer and enhancing a wet heat resistance, etc., of the film after attaching the coating layer to the polarizing film. Examples of the crosslinking agent ordinarily used for the above purpose include amino resin-based compounds such as melamine and benzoguanamine; oxazoline-based compounds, carbodiimide-based compounds, epoxy-based compounds and isocyanate-based compounds, as well as so-called polymer-type crosslinking agents obtained by copolymerizing the above crosslinkable functional group with the other polymer skeleton. If the crosslinking agent is used in the present invention, it is important that care should be taken so as not to cause deterioration in easy-bonding property of the resulting coating layer.

In order to subject the coating layer to crosslinking reaction while maintaining a good easy-bonding property thereof, it is required to prevent the crosslink density in the coating layer from increasing excessively. For this purpose, the amount of the crosslinking agent used may be suitably suppressed, or the crosslinking agent having a reduced amount of functional groups may be used.

The amount of the functional groups as used herein is intended to express how many crosslinkable functional groups are present per a weight of a molecule of the crosslinking agent. For example, the structure of the crosslinking agent is identified by $^{13}$C-NMR, and the amount of the crosslinkable functional groups is measured by $^1$H-NMR, so that the proportion of the crosslinkable functional groups per a molecular weight of the crosslinking agent can be determined. When using the crosslinking agent comprising a large amount of the functional groups, the amount of the crosslinking agent used should be reduced. In the present invention, the crosslinking agent comprising the functional groups, in particular, in an amount of more than 10 mmol/g, is used in an amount of not more than 20% by weight based on the total weight of the coating layer.

On the other hand, the crosslinking agents comprising a small amount of the functional groups are preferably used because the properties thereof tend to be stabilized irrespective of the amount of the crosslinking agents used. In particular, the polymer-type crosslinking agents comprising a small amount of the functional groups are preferably used. More specifically, the crosslinking agents comprising the functional groups in an amount of less than 10 mmol/g can be added to the coating layer in an optional amount based on the total amount of the coating layer. However, the upper limit of the amount of the crosslinking agents incorporated in the coating layer is not more than 80% by weight, preferably not more than 60% by weight and more preferably not more than 40% by weight, in order to attain a high effect of enhancing an adhesion property of the above urethane resin.

In the most preferred embodiment of the present invention, a polyurethane comprising a carboxyl group is used in combination with a polymer-type crosslinking agent having an oxazoline group.

Also, the laminated polyester film including the coating layer comprising the urethane resin having such a low Tg as described above tends to suffer from so-called blocking which is such a phenomenon that front and rear surfaces of the film are stuck and attached together when the laminated film is wound into a roll. In order to prevent occurrence of the blocking of the film, the coating layer preferably comprises particles as a constitutional component of the coating layer.

The content of the particles in the coating layer is preferably in the range of 3 to 25% by weight, more preferably 5 to 15% by weight and still more preferably 5 to 10% by weight based on a total weight of the coating layer. When the content of the particles in the coating layer is less than 3% by weight, the effect of preventing occurrence of blocking tends to be insufficient. On the other hand, when the content of the particles in the coating layer is more than 25% by weight, although the effect of presenting occurrence of blocking becomes high, the resulting coating layer tends to be deteriorated in transparency as well as continuity, so that there tend to occur problems such as deteriorated coating film strength and poor easy-bonding property. By using the particles within the above-specified range, it is possible to satisfy both of a good easy-bonding property and a good anti-blocking property of the resulting film.

Examples of the particles used in the coating layer include inorganic particles such as silica, alumina and metal oxides, and organic particles such as crosslinked polymer particles. In particular, from the viewpoints of a good dispersibility in the coating layer and a good transparency of the resulting coating film, silica particles are preferably used.

When the particle diameter of the particles added to the coating layer is too small, the effect of preventing occurrence of blocking tends to be hardly attained. When the particle diameter of the particles is too large, the particles tend to be fallen off from the resulting coating film. The average particle diameter of the particles used in the coating layer is preferably about ½ to about 10 times the thickness of the coating layer. Further, since the excessively large particle diameter of the particles tends to cause deterioration in transparency of the coating layer, the average particle diameter of the particles used in the coating layer is preferably not more than 300 nm and more preferably not more than 150 nm. The average particle diameter of the particles as used herein may be determined by measuring a 50% number-average particle diameter of the particles in a dispersion thereof using "MICROTRACK UPA" manufactured by Nikkiso Co., Ltd.

In the second coating layer according to the present invention, in order to improve surface properties of the coating layer and improve a transparency of the resulting film, a binder polymer other than the above urethane resin having a polycarbonate structure may be used in combination therewith.

Specific examples of the binder polymer include polyester resins, acrylic resins, urethane resins, polyvinyl resins (such as polyvinyl alcohol, polyvinyl chloride and vinyl chloride-vinyl acetate copolymers), polyalkylene glycols, polyalkylene imines, methyl cellulose, hydroxy cellulose, starches, etc.

In the present invention, the content of the above urethane resin in the second coating layer is not particularly limited. This is because, although the second coating layer may be formed of the urethane resin as a main component, the second coating layer having an enhanced adhesion property can also be obtained merely by mixing a suitable small amount of the urethane resin in a coating layer comprising the other easy-bonding resin as a main component. Therefore, the content of the urethane resin in the second coating layer may be appropriately selected according to the aimed properties thereof. However, when the content of the urethane resin in the second coating layer is too small, the effect by using the urethane resin tends to be hardly attained. Therefore, the lower limit of the content of the urethane resin in the second coating layer is usually in the range of not less than 20% by weight, preferably not less than 40% by weight and more preferably not less than 50% by weight based on a total weight of the second coating layer.

Further, the first and second coating layers may also respectively comprise various additives such as a defoaming agent, a coatability improver, a thickening agent, an organic lubricant, an antistatic agent, an ultraviolet absorber, an antioxidant, a foaming agent and a dye, if required, unless the subject matter of the present invention is adversely affected thereby.

The analysis of the respective components contained in the coating layer may be conducted, for example, by surface analysis such as TOF-SIMS.

When forming the coating layer by in-line coating, the laminated polyester film is preferably produced by the method in which an aqueous solution or a water dispersion of a series of the above-mentioned compounds is prepared as a coating solution having a concentration of about 0.1 to about 50% by weight in terms of a solid content thereof, and the thus prepared coating solution is applied onto the polyester film. The coating solution may also comprise a small amount of an organic solvent for the purpose of improving a dispersibility in water, a film-forming property, etc., unless the subject matter of the present invention is adversely affected thereby. The organic solvent may be used alone, or two or more organic solvents may be appropriately used in the form of a mixture thereof.

The thickness of the first coating layer of the laminated polyester film according to the present invention is preferably in the range of 0.04 to 0.15 μm and more preferably 0.06 to 0.13 μm. When the thickness of the first coating layer is out of the above-specified range, the resulting film may fail to exhibit a high total light transmittance.

The thickness of the second coating layer of the laminated polyester film according to the present invention is usually in the range of 0.002 to 1.0 μm, preferably 0.005 to 0.5 μm and more preferably 0.01 to 0.2 μm. When the film thickness of the second coating layer is less than 0.002 μm, the resulting coating layer may fail to exhibit a sufficient adhesion property. When the thickness of the second coating layer is more than 1.0 μm, the resulting coating layer tends to be deteriorated in appearance and transparency, and the obtained laminated film tends to be deteriorated in anti-blocking property.

In the present invention, as the method of forming the respective coating layers, there may be used conventionally known coating methods such as a reverse gravure coating method, a direct gravure coating method, a roll coating method, a die coating method, a bar coating method and a curtain coating method which are described, for example, in Yuji HARAZAKI, "Coating Methods", Maki-shoten, 1979.

In the present invention, the drying and curing conditions used upon forming the coating layers on the polyester film are not particularly limited. For example, in the case where the coating layers are formed in an off-line coating manner, the coating layers may be subjected to heat treatment usually at a temperature of 80 to 200° C. for 3 to 40 sec and preferably at a temperature of 100 to 180° C. for 3 to 40 sec. On the other hand, in the case where the coating layers are formed in an in-line coating manner, the coating layers may be subjected to heat treatment usually at a temperature of 70 to 280° C. for 3 to 200 sec. In any of the off-line coating and in-line coating methods, the heat treatment may be used in combination with irradiation with active energy rays such as irradiation with ultraviolet rays, if required. The polyester film constituting the laminated polyester film of the present invention may be previously subjected to surface treatments such as corona treatment and plasma treatment.

When using the laminated polyester film of the present invention, for example, as a protective film for a polarizing film in a polarizing plate, the polarizing film is generally attached to the side of the second coating layer thereof through an adhesive for adhering the polarizing film thereto. As the adhesive, there may be used the conventionally known adhesives. Examples of the adhesive include polyvinyl alcohol-based compounds such as polyvinyl alcohol and polyvinyl butyral, acrylic compounds such as poly(butyl acrylate), and epoxy compounds having an alicyclic epoxy group such as, for example, a glycidyl group and an epoxy-cyclohexane group.

Onto the adhesive layer thus formed is attached a polarizing film, for example, a monoaxially stretched polyvinyl alcohol film dyed with iodine, etc. A protective film may be further attached onto the opposite side of the polarizing film to produce the polarizing plate. That is, when using the laminated polyester film of the present invention for the polarizing plate, the obtained polarizing plate may have a layer configuration of the "first coating layer/polyester film/second coating layer/adhesive/polarizing film/protective film".

EXAMPLES

The present invention is described in more detail below by Examples. However, these Examples are only illustrative and not intended to limit the present invention thereto. In addition, the measuring and evaluating methods used in the present invention are as follows.

(1) Measurement of Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Measurement of Average Particle Diameter ($D_{50}$: μm):

Using a centrifugal precipitation type particle size distribution measuring apparatus "SA-CP3 Model" manufactured by Shimadzu Seisakusho Co., Ltd., the value of a particle size corresponding to a cumulative fraction of 50% (based on the weight) in equivalent spherical distribution of the particles was measured as an average particle diameter.

(3) Glass Transition Point (Tq):

A solution or a water dispersion of a urethane resin was dried in a petri dish of "Teflon (registered trademark)" so as to form a coating film thereof having thickness of 500 μm after dried. The drying conditions were adjusted such that the solution or water dispersion was dried at room temperature for one week, and then further dried at 120° C. for 10 min. The thus obtained coating film was cut into a width of 5 mm, and set to a dynamic viscoelastic analyzer "DVA-200 Model" manufactured by I.T. Keisoku Seigyo Co., Ltd., such that a distance between chucks was 20 mm, and while the temperature therein was raised at a rate of 10° C./min from −100° C. to 200° C., the measurement of E" was conducted at a frequency of 10 Hz. The point at which E" reached a maximum value was determined as Tg.

(4) Method of Measuring Thickness of Coating Layer:

The film was fixed in an embedding resin, and cut in section using a microtome. The cut section of the film was dyed with osmic acid and observed by a transmission electron microscope "JEM2010" available from Nippon Denshi Co., Ltd., to measure a thickness of the coating layer.

(5) Method of Measuring Total Light Transmittance:

Measured using a haze meter "HM-150" available from Murakami Color Research Laboratory Co., Ltd., according to JIS K 7361.

(6) Method of Measuring Minimum Value of Absolute Reflectance from Surface of First Coating Layer Formed on Polyester Film:

A black tape ("Vinyl Tape VT-50" produced by Nichiban Co., Ltd.) was previously attached to a back surface (second coating layer-side surface) of a polyester film which was opposite to its surface to be measured, and the surface of a coating layer formed on the polyester film was subjected to measurement for an absolute reflectance thereof in a wavelength range of 300 to 800 nm using a spectrophotometer (an ultraviolet/visible spectrophotometer "V-570" and an automatic absolute reflectance analyzer "AM-500N" both manufactured by JASCO Corp.) under the conditions including a synchronous mode; an incident angle of 5°; N-polarization; response: Fast; data sampling interval: 1.0 nm; band width: 10 nm; scanning speed: 1000 m/min, to thereby evaluate a wavelength at a minimum value of the reflectance (bottom wavelength) as well as an absolute reflectance.

(7) Method of Evaluating Adhesion Property:

A diglycidyl ether of bisphenol A as an adhesive was laminated on the surface of the second coating layer to form an adhesive layer thereon. The thus formed adhesive layer was subjected to cross-cutting to form 100 (10×10) cross-cuts thereon. A 18 mm-wide tape ("Cellotape (registered trademark) CT-18" produced by Nichiban Co., Ltd.) was attached onto the thus cross-cut adhesive layer, and then rapidly peeled off therefrom at a peel angle of 180°. Then, the surface of the adhesive layer from which the tape was peeled off was observed to measure an area of the adhesive layer peeled off together with the tape. The evaluation ratings are as follows.

A: Peeled area of the adhesive layer was not more than 5%.

B: Peeled area of the adhesive layer was more than 5% and not more than 20%.

C: Peeled area of the adhesive layer was more than 20% and not more than 50%.

D: Peeled area of the adhesive layer was more than 50%.

(8) Measurement of Transmittance at a Wavelength of 380 Nm:

Using a spectrophotometer ("UV-3100PC Model" manufactured by Shimadzu Seisakusho Corp.), the light transmittance of the film was continuously measured at a low scanning speed and a sampling pitch of 2 nm in a wavelength range of 300 to 700 nm to detect a light transmittance at 380 nm.

The polyesters used in the respective Examples and Comparative Examples were prepared by the following methods.

<Method for Producing Polyester (A)>

One hundred parts by weight of dimethyl terephthalate and 60 parts by weight of ethylene glycol as starting materials were charged together with 0.09 part by weight of magnesium acetate tetrahydrate as a catalyst into a reaction vessel, and the reaction therebetween was initiated at 150° C. The reaction temperature was gradually raised while distilling off methanol as produced, and allowed to reach 230° C. after 3 hr. After 4 hr, the transesterification reaction was substantially terminated. Into the obtained reaction mixture were added 0.04 part by weight of ethyl acid phosphate and then 0.04 part by weight of antimony trioxide, followed by subjecting the resulting mixture to polycondensation reaction for 4 hr. More specifically, the reaction temperature was gradually raised from 230° C. until reaching 280° C. On the other hand, the reaction pressure was gradually reduced from normal pressure until finally reaching 0.3 mmHg. After initiation of the reaction, the change in agitation power in the reaction vessel was monitored, and the reaction was terminated at the time at which a viscosity of the reaction solution reached the value corresponding to an intrinsic viscosity of 0.63 on the basis of the change in agitation power in the reaction vessel. The resulting polymer was discharged from the reaction vessel under application of a nitrogen pressure thereto, thereby obtaining a polyester (A) having an intrinsic viscosity of 0.63.

<Method for Producing Polyester (B)>

The same procedure as defined in the above method for producing the polyester (A) was conducted except that after adding 0.04 part by weight of ethyl acid phosphate, 0.2 part by weight of silica particles having an average particle diameter of 2.0 μm in the form of a dispersion in ethylene glycol and 0.04 part by weight of antimony trioxide were added, and the reaction was terminated at the time at which a viscosity of the reaction solution reached the value corresponding to an intrinsic viscosity of 0.65, thereby obtaining a polyester (B) having an intrinsic viscosity of 0.65.

<Method for Producing Polyester (C)>

The polyester (A) was charged into a vented twin-screw extruder, and 2,2-(1,4-phenylene)bis[4H-3,1-benzoxazin-4-one] ("CYASORB UV-3638" produced by CYTEC Corp.; molecular weight: 369; benzoxazinone-based compound) as an ultraviolet absorber was further added thereto such that a concentration of the ultraviolet absorber in the resulting mixture was 10% by weight. The thus obtained mixture was melt-kneaded and extruded to form chips, thereby obtaining an ultraviolet absorber-containing master batch polyester (C). The resulting polyester (C) had an intrinsic viscosity of 0.59.

The examples of the compounds constituting the coating layers are as follows.

<Acrylic Resin: (IA) Water Dispersion of Acrylic Resin Obtained by Polymerizing the Following Composition:

Emulsion polymer (emulsifier: anionic surfactant) produced from ethyl acrylate/n-butyl acrylate/methyl methacrylate/N-methylol acrylamide/acrylic acid=65/21/10/2/2 (% by weight)

<Acrylic Resin: (IB) Water Dispersion of Acrylic Resin Obtained by Polymerizing the Following Composition:

Emulsion polymer (emulsifier: anionic surfactant) produced from ethyl acrylate/methyl methacrylate/2-hydroxyethyl methacrylate/N-methylol acrylamide/acrylic acid=65/28/3/2/2 (% by weight)

<Urethane Resin Having a Polycarbonate Structure: (IIA)>

Water dispersion of a urethane resin having Tg of –30° C. which was obtained by neutralizing a prepolymer produced from 400 parts of a polycarbonate polyol having a number-average molecular weight of 2000 which was obtained from 1,6-hexanediol and diethyl carbonate, 10.4 parts of neopentyl glycol, 58.4 parts of isophorone diisocyanate and 74.3 parts of dimethylol butanoic acid with triethylamine, and then subjecting the neutralized product to chain extension reaction using isophorone diamine.

<Urethane Resin Having a Polycarbonate Structure: (IIB)>

Water-dispersed type polycarbonate polyurethane resin "RU-40-350" comprising a carboxyl group and having Tg of –20° C. (produced by Stahl Inc.)

<Urethane Resin Having a Polycarbonate Structure: (IIC)>

Carboxylic acid water-dispersed type vinyl group-containing polycarbonate polyurethane resin "SPX-039" having Tg of 3° C. (produced by ADEKA Corp.)

<Urethane Resin: (IID)>

Carboxylic acid water-dispersed type polyester polyurethane resin "HYDRAN AP-40" (produced by DIC Corp.)

<Polyester Resin: (III) Water Dispersion of Polyester Resin Obtained by Copolymerizing the Following Composition Monomer composition: (acid component) terephthalic acid/isophthalic acid/5-sodium sulfoisophthalic acid//(diol component) ethylene glycol/1,4-butanediol/diethylene glycol=56/40/4//70/20/10 (mol %)

<Oxazoline Compound: (IVA)>

Polymer-type crosslinking agent "EPOCROSS WS-500" (produced by Nippon Shokubai Co., Ltd.) in which an oxazoline group is bonded as a branched chain to an acrylic resin (oxazoline group content: 4.5 mmol/g).

<Epoxy Compound: (IVB)>

Polyglycerol polyglycidyl ether "DECONAL EX-521" (produced by Nagase Chemtex Co., Ltd.; epoxy group content: 5.5 mmol/g)

<Melamine Compound: (IVC) Hexamethoxymethyl Melamine>

<Particles: (V) Silica Sol Having an Average Particle Diameter of 65 nm>

Example 1

A mixed raw material obtained by mixing the polyesters (A) and (B) in amounts of 90% and 10%, respectively, as a raw material for outermost layers (surface layers), and the polyester (A) as a raw material for an intermediate layer, were respectively charged into two extruders, melted therein at 285° C., and then co-extruded therefrom on a cooling roll whose surface was controlled to a temperature of 40° C. to form a sheet having a two-kind/three-layer structure (surface layer/intermediate layer/surface layer), followed by cooling and solidifying the thus co-extruded sheet on the cooling roll, thereby obtaining an unstretched sheet. Next, the thus obtained unstretched sheet was stretched utilizing a difference between peripheral speeds of rolls at a temperature of 85° C. and a stretch ratio of 3.4 times in a longitudinal direction thereof. Thereafter, a coating solution A1 shown in the below-mentioned Table 1 was applied on one surface of the thus obtained longitudinally stretched sheet (formation of a first coating layer), and a coating solution B1 shown in Table 1 was applied on the other surface of the sheet (formation of a second coating layer). Then, the resulting coated sheet was introduced into a tenter where the sheet was stretched at a temperature of 120° C. and a stretch ratio of 4.3 times in a lateral direction thereof and then heat-treated at 225° C. Next, the obtained stretched sheet was relaxed by 2% in a lateral direction thereof, thereby obtaining a polyester film having a thickness of 38 μm (each surface layer: 4 μm; intermediate layer: 30 μm) which was provided on both the surfaces thereof with the first and second coating layers having coating amounts (after dried) of 0.12 g/m² and 0.03 g/m², respectively. As a result of evaluating properties of the thus obtained polyester film, it was confirmed that the total light transmittance of the film was high, and the second coating layer exhibited a good adhesion property. The properties of the obtained polyester film are shown in Table 2.

Examples 2 to 28

The same procedure as defined in Example 1 was conducted except that the coating agent composition was changed to those shown in Table 1, thereby obtaining polyester films. The properties of the thus obtained polyester films are shown in Table 2.

Comparative Examples 1 to 7

The same procedure as defined in Example 1 was conducted except that the coating agent composition was changed to those shown in Table 1, thereby obtaining polyester films. The evaluation results of the thus obtained laminated polyester films are as shown in Table 2 namely, it was confirmed that some of the films failed to exhibit a minimum value of the reflectance, or some other films had a low adhesion property.

TABLE 1

| Coating solutions | Coating agent composition (wt %) | | | | | |
|---|---|---|---|---|---|---|
| | IA | IB | IIA | IIB | IIC | IID |
| Coating solution A1 | 65 | 0 | 0 | 0 | 0 | 0 |
| Coating solution A2 | 75 | 0 | 0 | 0 | 0 | 0 |
| Coating solution A3 | 50 | 0 | 0 | 0 | 0 | 0 |
| Coating solution A4 | 0 | 95 | 0 | 0 | 0 | 0 |
| Coating solution A5 | 0 | 0 | 65 | 0 | 0 | 0 |
| Coating solution A6 | 0 | 0 | 80 | 0 | 0 | 0 |
| Coating solution A7 | 0 | 0 | 50 | 0 | 0 | 0 |
| Coating solution A8 | 0 | 0 | 0 | 0 | 0 | 85 |
| Coating solution B1 | 0 | 0 | 60 | 0 | 0 | 0 |
| Coating solution B2 | 0 | 0 | 0 | 60 | 0 | 0 |
| Coating solution B3 | 0 | 0 | 0 | 0 | 60 | 0 |
| Coating solution B4 | 0 | 0 | 60 | 0 | 0 | 0 |
| Coating solution B5 | 0 | 0 | 70 | 0 | 0 | 0 |
| Coating solution B6 | 0 | 0 | 50 | 0 | 0 | 10 |
| Coating solution B7 | 0 | 0 | 30 | 0 | 0 | 30 |
| Coating solution C1 | 0 | 0 | 0 | 0 | 0 | 60 |

| Coating solutions | Coating agent composition (wt %) | | | | |
|---|---|---|---|---|---|
| | III | IVA | IVB | IVC | V |
| Coating solution A1 | 25 | 0 | 0 | 5 | 5 |
| Coating solution A2 | 15 | 0 | 0 | 5 | 5 |
| Coating solution A3 | 45 | 0 | 0 | 0 | 5 |
| Coating solution A4 | 0 | 0 | 0 | 0 | 5 |
| Coating solution A5 | 20 | 10 | 0 | 0 | 5 |
| Coating solution A6 | 0 | 15 | 0 | 0 | 5 |
| Coating solution A7 | 40 | 0 | 0 | 5 | 5 |
| Coating solution A8 | 5 | 5 | 0 | 0 | 5 |
| Coating solution B1 | 0 | 34 | 0 | 0 | 6 |
| Coating solution B2 | 0 | 34 | 0 | 0 | 6 |
| Coating solution B3 | 0 | 34 | 0 | 0 | 6 |
| Coating solution B4 | 0 | 17 | 17 | 0 | 6 |
| Coating solution B5 | 0 | 24 | 0 | 0 | 6 |
| Coating solution B6 | 0 | 34 | 0 | 0 | 6 |
| Coating solution B7 | 0 | 34 | 0 | 0 | 6 |
| Coating solution C1 | 0 | 34 | 0 | 0 | 6 |

TABLE 2

| Examples and Comp. Examples | First coating layer | | | | Second coating layer | | Adhesion property | Total light transmittance (%) |
|---|---|---|---|---|---|---|---|---|
| | Coating solution | Thickness (µm) | Bottom wavelength (nm) | Minimum value of absolute reflectance (%) | Coating solution | Thickness (µm) | | |
| Example 1 | A1 | 0.10 | 560 | 2.5 | B1 | 0.02 | A | 91.3 |
| Example 2 | A2 | 0.10 | 550 | 2.4 | B1 | 0.02 | A | 91.5 |
| Example 3 | A3 | 0.10 | 540 | 2.9 | B1 | 0.02 | A | 90.8 |
| Example 4 | A4 | 0.10 | 520 | 2.1 | B1 | 0.02 | A | 91.8 |
| Example 5 | A1 | 0.10 | 560 | 2.5 | B2 | 0.02 | A | 91.3 |
| Example 6 | A1 | 0.10 | 560 | 2.5 | B3 | 0.02 | A | 91.3 |
| Example 7 | A1 | 0.10 | 560 | 2.5 | B4 | 0.02 | A | 91.3 |
| Example 8 | A1 | 0.10 | 560 | 2.5 | B5 | 0.02 | A | 91.3 |
| Example 9 | A1 | 0.10 | 560 | 2.5 | B6 | 0.02 | A | 91.3 |
| Example 10 | A1 | 0.10 | 560 | 2.5 | B7 | 0.02 | B | 91.3 |
| Example 11 | A1 | 0.06 | 340 | 3.1 | B1 | 0.02 | A | 90.3 |
| Example 12 | A1 | 0.08 | 440 | 2.6 | B1 | 0.02 | A | 91.1 |
| Example 13 | A1 | 0.12 | 640 | 2.5 | B1 | 0.02 | A | 91.0 |
| Example 14 | A1 | 0.14 | 770 | 2.5 | B1 | 0.02 | A | 90.3 |
| Example 15 | A5 | 0.10 | 560 | 2.5 | B1 | 0.02 | A | 91.3 |
| Example 16 | A6 | 0.10 | 560 | 2.3 | B1 | 0.02 | A | 91.7 |
| Example 17 | A7 | 0.10 | 570 | 2.9 | B1 | 0.02 | A | 90.8 |
| Example 18 | A8 | 0.10 | 570 | 2.9 | B1 | 0.02 | A | 91.3 |
| Example 19 | A5 | 0.10 | 560 | 2.5 | B2 | 0.02 | A | 91.3 |
| Example 20 | A5 | 0.10 | 560 | 2.5 | B3 | 0.02 | A | 91.3 |
| Example 21 | A5 | 0.10 | 560 | 2.5 | B4 | 0.02 | A | 91.3 |
| Example 22 | A5 | 0.10 | 560 | 2.5 | B5 | 0.02 | A | 91.3 |
| Example 23 | A5 | 0.10 | 560 | 2.5 | B6 | 0.02 | A | 91.3 |
| Example 24 | A5 | 0.10 | 560 | 2.5 | B7 | 0.02 | B | 91.3 |
| Example 25 | A5 | 0.06 | 350 | 3.1 | B1 | 0.02 | A | 90.4 |
| Example 26 | A5 | 0.08 | 440 | 2.6 | B1 | 0.02 | A | 91.1 |
| Example 27 | A5 | 0.12 | 650 | 2.5 | B1 | 0.02 | A | 91.0 |
| Example 28 | A5 | 0.14 | 760 | 2.5 | B1 | 0.02 | A | 90.3 |
| Comp. Example 1 | A1 | 0.03 | None | None | B1 | 0.02 | A | 89.5 |
| Comp. Example 2 | A1 | 0.17 | None | None | B1 | 0.02 | A | 89.5 |
| Comp. Example 3 | A1 | 0.10 | 560 | 2.5 | C1 | 0.02 | D | 91.2 |
| Comp. Example 4 | A5 | 0.04 | None | None | B1 | 0.02 | A | 89.6 |
| Comp. Example 5 | A5 | 0.17 | None | None | B1 | 0.02 | A | 89.6 |
| Comp. Example 6 | A5 | 0.10 | 560 | 2.5 | C1 | 0.02 | D | 91.2 |
| Comp. Example 7 | B1 | 0.02 | None | None | B1 | 0.02 | A | 88.9 |

Example 29

The same procedure as defined in Example 1 was conducted except that a mixed raw material obtained by mixing the polyesters (A) and (B) in amounts of 90% and 10%, respectively, was used as a raw material for outermost layers (surface layers), and a mixed raw material obtained by mixing the polyesters (A) and (C) in amounts of 85% and 15%, respectively, was used as a raw material for an intermediate layer, thereby obtaining a polyester film. As a result of evaluating properties of the thus obtained polyester film, it was confirmed that the total light transmittance of the film was high, and the second coating layer exhibited a good adhesion property, and further the polyester film had a transmittance of 4% as measured at 380 nm and therefore was capable of well absorbing an ultraviolet ray. The properties of the polyester film are shown in Table 3 below.

Examples 30 to 42 and 45 to 58

The same procedure as defined in Example 29 was conducted except that the coating agent composition was changed to those shown in Table 1, thereby obtaining polyester films. The properties of the thus obtained polyester films are as shown in Table 3.

Examples 43 and 59

The same procedure as defined in Example 1 was conducted except that a mixed raw material obtained by mixing the polyesters (A) and (B) in amounts of 90% and 10%, respectively, was used as a raw material for outermost layers (surface layers), and a mixed raw material obtained by mixing the polyesters (A) and (C) in amounts of 80% and 20%, respectively, was used as a raw material for an intermediate layer, thereby obtaining polyester films. The properties of the thus obtained polyester films are shown in Table 3. Also, it was confirmed that the polyester films had a transmittance of 1% as measured at 380 nm and therefore was capable of well absorbing an ultraviolet ray.

Examples 44 and 60

The same procedure as defined in Example 1 was conducted except that a mixed raw material obtained by mixing the polyesters (A) and (B) in amounts of 90% and 10%, respectively, was used as a raw material for outermost layers (surface layers), and a mixed raw material obtained by mixing the polyesters (A) and (C) in amounts of 90% and 10%, respectively, was used as a raw material for an intermediate layer, thereby obtaining polyester films. The properties of the thus obtained polyester films are shown in Table 3. Also, it was confirmed that the polyester films had a transmittance of 9% as measured at 380 nm and therefore was capable of well absorbing an ultraviolet ray.

Comparative Examples 8 to 14

The same procedure as defined in Example 29 was conducted except that the coating agent composition of Example 29 was changed to those shown in Table 1, thereby obtaining polyester films. The evaluation results of the thus obtained laminated polyester films are as shown in Table 3, namely, it was confirmed that some of the films failed to exhibit a minimum value of a reflectance, or some other films had a low adhesion property.

TABLE 3

| Examples and Comp. Examples | First coating layer | | | Minimum value of absolute reflectance (%) |
|---|---|---|---|---|
| | Coating solution | Thickness (μm) | Bottom wavelength (nm) | |
| Example 29 | A1 | 0.10 | 560 | 2.5 |
| Example 30 | A2 | 0.10 | 550 | 2.4 |
| Example 31 | A3 | 0.10 | 540 | 2.9 |
| Example 32 | A4 | 0.10 | 520 | 2.1 |
| Example 33 | A1 | 0.10 | 560 | 2.5 |
| Example 34 | A1 | 0.10 | 560 | 2.5 |
| Example 35 | A1 | 0.10 | 560 | 2.5 |
| Example 36 | A1 | 0.10 | 560 | 2.5 |
| Example 37 | A1 | 0.10 | 560 | 2.5 |
| Example 38 | A1 | 0.10 | 560 | 2.5 |
| Example 39 | A1 | 0.06 | 340 | 3.1 |
| Example 40 | A1 | 0.08 | 440 | 2.6 |
| Example 41 | A1 | 0.12 | 640 | 2.5 |
| Example 42 | A1 | 0.14 | 770 | 2.5 |
| Example 43 | A1 | 0.10 | 560 | 2.5 |
| Example 44 | A1 | 0.10 | 560 | 2.5 |
| Example 45 | A5 | 0.10 | 560 | 2.5 |
| Example 46 | A6 | 0.10 | 560 | 2.3 |
| Example 47 | A7 | 0.10 | 570 | 2.9 |
| Example 48 | A8 | 0.10 | 570 | 2.9 |
| Example 49 | A5 | 0.10 | 560 | 2.5 |
| Example 50 | A5 | 0.10 | 560 | 2.5 |
| Example 51 | A5 | 0.10 | 560 | 2.5 |
| Example 52 | A5 | 0.10 | 560 | 2.5 |
| Example 53 | A5 | 0.10 | 560 | 2.5 |
| Example 54 | A5 | 0.10 | 560 | 2.5 |
| Example 55 | A5 | 0.06 | 350 | 3.1 |
| Example 56 | A5 | 0.08 | 440 | 2.6 |
| Example 57 | A5 | 0.12 | 650 | 2.5 |
| Example 58 | A5 | 0.12 | 760 | 2.5 |
| Example 59 | A5 | 0.10 | 560 | 2.5 |
| Example 60 | A5 | 0.10 | 560 | 2.5 |
| Comp. Example 8 | A1 | 0.03 | None | None |
| Comp. Example 9 | A1 | 0.17 | None | None |
| Comp. Example 10 | A1 | 0.10 | 560 | 2.5 |
| Comp. Example 11 | A5 | 0.03 | None | None |
| Comp. Example 12 | A5 | 0.17 | None | None |
| Comp. Example 13 | A5 | 0.10 | 560 | 2.5 |
| Comp. Example 14 | B1 | 0.02 | None | None |

| Examples and Comp. Examples | Second coating layer | | | Total light transmittance (%) | Transmittance at 380 nm (%) |
|---|---|---|---|---|---|
| | Coating solution | Thickness (μm) | Adhesion property | | |
| Example 29 | B1 | 0.02 | A | 91.3 | 4 |
| Example 30 | B1 | 0.02 | A | 91.5 | 4 |
| Example 31 | B1 | 0.02 | A | 90.8 | 4 |
| Example 32 | B1 | 0.02 | A | 91.8 | 4 |
| Example 33 | B2 | 0.02 | A | 91.3 | 4 |
| Example 34 | B3 | 0.02 | A | 91.3 | 4 |
| Example 35 | B4 | 0.02 | A | 91.3 | 4 |
| Example 36 | B5 | 0.02 | A | 91.3 | 4 |
| Example 37 | B6 | 0.02 | A | 91.3 | 4 |
| Example 38 | B7 | 0.02 | B | 91.3 | 4 |
| Example 39 | B1 | 0.02 | A | 90.3 | 4 |
| Example 40 | B1 | 0.02 | A | 91.1 | 4 |
| Example 41 | B1 | 0.02 | A | 91.0 | 4 |
| Example 42 | B1 | 0.02 | A | 90.3 | 4 |
| Example 43 | B1 | 0.02 | A | 91.3 | 1 |
| Example 44 | B1 | 0.02 | A | 91.3 | 9 |
| Example 45 | B1 | 0.02 | A | 91.3 | 4 |
| Example 46 | B1 | 0.02 | A | 91.7 | 4 |
| Example 47 | B1 | 0.02 | A | 90.8 | 4 |
| Example 48 | B1 | 0.02 | A | 90.8 | 4 |
| Example 49 | B2 | 0.02 | A | 91.3 | 4 |

TABLE 3-continued

| | | | | | |
|---|---|---|---|---|---|
| Example 50 | B3 | 0.02 | A | 91.3 | 4 |
| Example 51 | B4 | 0.02 | A | 91.3 | 4 |
| Example 52 | B5 | 0.02 | A | 91.3 | 4 |
| Example 53 | B6 | 0.02 | A | 91.3 | 4 |
| Example 54 | B7 | 0.02 | B | 91.3 | 4 |
| Example 55 | B1 | 0.02 | A | 90.4 | 4 |
| Example 56 | B1 | 0.02 | A | 91.1 | 4 |
| Example 57 | B1 | 0.02 | A | 91.0 | 4 |
| Example 58 | B1 | 0.02 | A | 90.3 | 4 |
| Example 59 | B1 | 0.02 | A | 91.3 | 1 |
| Example 60 | B1 | 0.02 | A | 91.3 | 9 |
| Comp. Example 8 | B1 | 0.02 | A | 89.5 | 4 |
| Comp. Example 9 | B1 | 0.02 | A | 89.5 | 4 |
| Comp. Example 10 | C1 | 0.02 | D | 91.2 | 4 |
| Comp. Example 11 | B1 | 0.02 | A | 89.6 | 4 |
| Comp. Example 12 | B1 | 0.02 | A | 89.6 | 4 |
| Comp. Example 13 | C1 | 0.02 | D | 91.2 | 4 |
| Comp. Example 14 | B1 | 0.02 | A | 88.9 | 4 |

INDUSTRIAL APPLICABILITY

The film of the present invention can be suitably used in the applications in which a good adhesion property to various adhesives and a high total light transmittance are required, for example, such as protective films for polarizing films used in liquid crystal displays, etc.

The invention claimed is:

1. A laminated polyester film having a total light transmittance of not less than 90.0% and comprising:
    a polyester film;
    a first coating layer formed on one surface of the polyester film which comprises an acrylic resin or a urethane resin as a main component having a thickness of 0.04 to 0.15 µm; and
    a second coating layer formed on the other surface of the polyester film which comprises not less than 40% by weight of a urethane resin having a polycarbonate structure and a glass transition point of not higher than −20° C. based on a total weight of the second coating layer.

2. A laminated polyester film according to claim 1, wherein the coating layer comprising the urethane resin having a polycarbonate structure further comprises a crosslinking agent.

3. A laminated polyester film according to claim 2, wherein the crosslinking agent is a polymer-type crosslinking agent having an oxazoline group.

4. A laminated polyester film according to claim 2, wherein the coating layer comprises particles in an amount of 3 to 25% by weight based on a total weight of the coating layer.

5. A laminated polyester film according to claim 1, wherein the polyester film comprises an ultraviolet absorber.

6. A laminated polyester film according to claim 5, wherein the ultraviolet absorber is a benzoxazinone-based compound.

7. A laminated polyester film according to claim 1, wherein the urethane resin having a polycarbonate structure is a self-emulsifiable type urethane resin which is ionomerized by introducing a carboxyl group into a skeleton of urethane resins.

8. A laminated polyester film according to claim 1, wherein the coating layer formed on one surface of the polyester film which comprises an acrylic resin or a urethane resin as a main component has one minimum value of the absolute reflectance in the wavelength range of 300 to 800 nm, and the absolute reflectance as measured at the minimum value is not more than 3.5%.

9. A laminated polyester film having a total light transmittance of not less than 90.0% and comprising:
    a polyester film consisting essentially of homopolyester or a copolyester, wherein the homopolyester is obtained by polycondensing an aromatic dicarboxylic acid selected from the group consisting of terephthalic acid and 2,6-naphthalenedicarboxylic acid, and an aliphatic glycol selected from the group consisting of ethylene glycol, diethylene glycol and 1,4-cyclohexanedimethanol, and wherein the copolyester is obtained by polycondensing a dicarboxylic acid of at least one compound selected from the group consisting of isophthalic acid, phthalic acid, terephthalic acid, 2,6-naphthalenedicarboxylic acid, adipic acid, sebacic acid and oxycarboxylic acids, and a glycol of at least one compound selected from the group consisting of ethylene glycol, diethylene glycol, propylene glycol, butanediol, 4-cyclohexanedimethanol and neopentyl glycol;
    a coating layer formed on one surface of the polyester film which comprises an acrylic resin or a urethane resin as a main component and has a thickness of 0.04 to 0.15 µm; and
    a coating layer formed on the other surface of the polyester film which comprises a urethane resin having a polycarbonate structure and a glass transition point of not higher than −20° C.

10. A laminated polyester film according to claim 9, wherein the coating layer comprising the urethane resin having a polycarbonate structure further comprises a crosslinking agent.

11. A laminated polyester film according to claim 10, wherein the crosslinking agent is a polymer-type crosslinking agent having an oxazoline group.

12. A laminated polyester film according to claim 10, wherein the coating layer comprises particles in an amount of 3 to 25% by weight based on a total weight of the coating layer.

13. A laminated polyester film according to claim 9, wherein the polyester film comprises an ultraviolet absorber.

14. A laminated polyester film according to claim 13, wherein the ultraviolet absorber is a benzoxazinone-based compound.

15. A laminated polyester film according to claim 9, wherein the urethane resin having a polycarbonate structure is a self-emulsifiable type urethane resin which is ionomerized by introducing a carboxyl group into a skeleton of urethane resins.

16. A laminated polyester film according to claim 9, wherein the coating layer formed on one surface of the polyester film which comprises an acrylic resin or a urethane resin as a main component has one minimum value of the absolute reflectance in the wavelength range of 300 to 800 nm, and the absolute reflectance as measured at the minimum value is not more than 3.5%.

17. A laminated polyester film according to claim 9, wherein the polyester film consisting essentially of homopolyester obtained by polycondensing an aromatic dicarboxylic acid selected from the group consisting of terephthalic acid and 2,6-naphthalenedicarboxylic acid, and an aliphatic glycol selected from the group consisting of ethylene glycol, diethylene glycol and 1,4-cyclohexanedimethanol.

18. A laminated polyester film comprising:
a polyester film;
a first coating layer formed on one surface of the polyester film which comprises an acrylic resin or a urethane resin as a main component;
a second coating layer formed on the other surface of the polyester film which comprises a urethane resin having a polycarbonate structure and a glass transition point of not higher than −20° C.; and
an adhesive layer formed on the second coating layer.

19. A laminated polyester film according to claim 18, wherein the coating layer comprising the urethane resin having a polycarbonate structure further comprises a crosslinking agent.

20. A laminated polyester film according to claim 18, wherein the coating layer comprising the acrylic resin or the urethane resin as a main component has a thickness of 0.04 to 0.15 µm.

21. A laminated polyester film according to claim 18, wherein the polyester film comprises an ultraviolet absorber.

22. A laminated polyester film according to claim 21, wherein the ultraviolet absorber is a benzoxazinone-based compound.

23. A laminated polyester film according to claim 18, further comprising a polarizing film on the adhesive layer.

24. A laminated polyester film according to claim 23, further comprising a protective film on the polarizing film.

* * * * *